No. 839,249. PATENTED DEC. 25, 1906.
W. E. WRIGHT.
CULTIVATOR ATTACHMENT.
APPLICATION FILED OCT. 12, 1906.

WITNESSES:

William E. Wright,
INVENTOR.

ATTORNEYS

UNITED STATES PATENT OFFICE.

WILLIAM E. WRIGHT, OF MAY, TEXAS.

CULTIVATOR ATTACHMENT.

No. 839,249. Specification of Letters Patent. Patented Dec. 25, 1906.

Application filed October 12, 1906. Serial No. 338,681.

*To all whom it may concern:*

Be it known that I, WILLIAM E. WRIGHT, a citizen of the United States, residing at May, in the county of Brown and State of Texas, have invented a new and useful Cultivator Attachment, of which the following is a specification.

This invention relates to harrow attachments for cultivators; and its object is to provide a simple and inexpensive device of this character which is of durable construction and which is adapted to be substituted for the shovels of a cultivator, so that said cultivator can be easily converted into a harrow. By substituting this attachment for the shovel of a riding-cultivator the harrow can be used for working the soil at opposite sides of rows, thereby rendering it particularly serviceable in cultivating small growths and suitable for working out corn, cotton, &c., for the first time.

With the above and other objects in view the invention consists of certain novel features of construction and combinations of parts, which will be hereinafter more fully described, and pointed out in the claims.

In the accompanying drawings is shown the preferred form of the invention.

Figure 1:
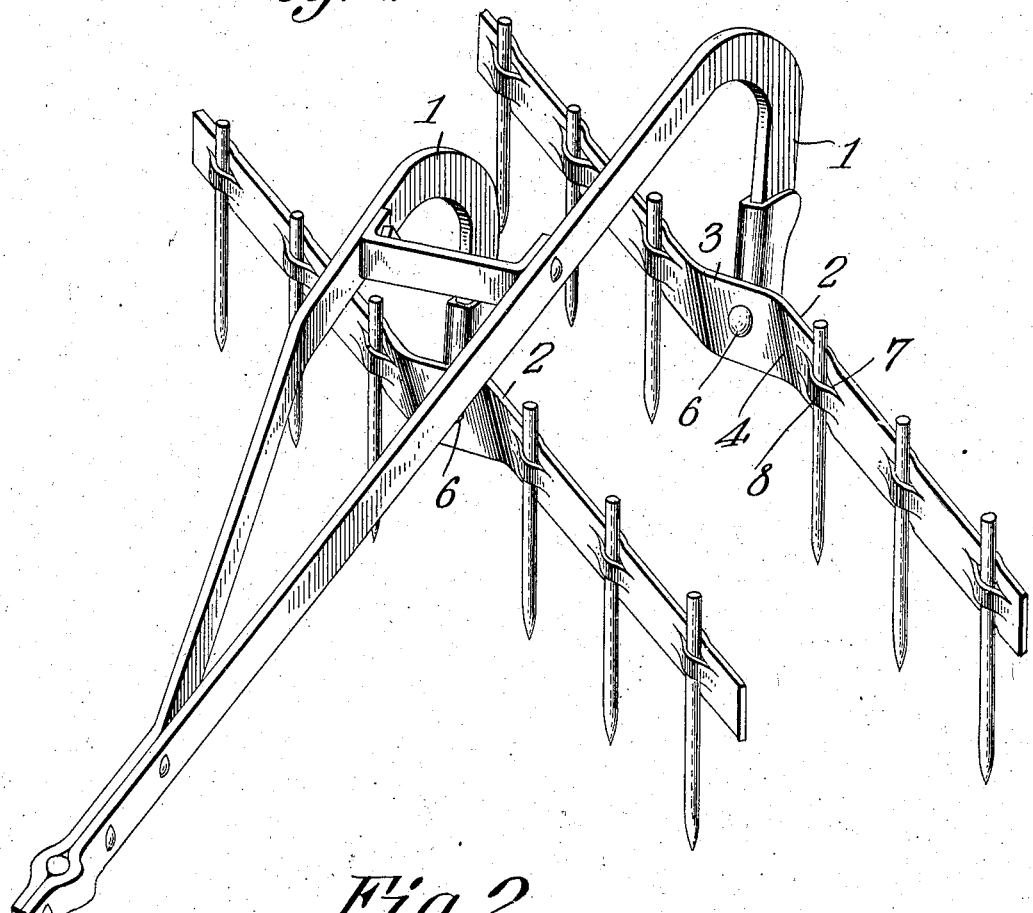
Figure 2:
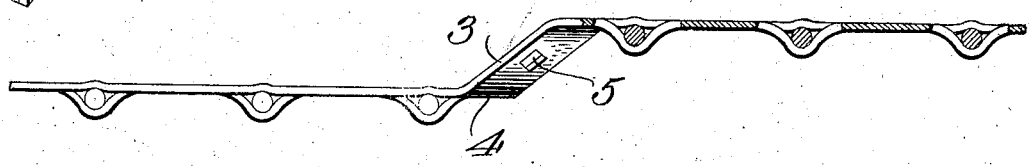

In said drawings, Figure 1 is a perspective view of a portion of a cultivator having the improved attachment applied thereto, said attachment being slightly exaggerated as compared to the cultivator-stocks; and Fig. 2 is a view, partly in plan and partly in section, of the attachment.

Referring to the figures by characters of reference, 1 1 are stocks of a cultivator, and to each of these stocks is secured an attachment constituting the present invention, said attachment being adapted to be used in place of the cultivator-shovels, which are ordinarily secured to the stocks. The attachment comprises a metallic strip 2 of any suitable proportions, having an offset intermediate portion 3 bent along diagonal lines, as shown at 4, so that said offset portion is disposed at an incline to the planes occupied by the edges of the strip. This offset portion has an opening 5 for the reception of the bolt 6, whereby the same may be readily fastened to the stock. Arranged within the strip 2 at desired intervals are pairs of parallel slits 7, and those portions of the strip between the slits are struck outward to form holding-straps 8. Teeth 9 are adapted to be driven between these straps 8 and the strips and are held in place by frictional contact therewith. These teeth are preferably in the form of elongated cylindrical prongs having their lower ends pointed.

Importance is attached to the fact that the attachment outside of the teeth is formed in but a single piece and that therefore there are no parts to become detached and lost. By forming the strip of spring metal the straps 8 will exert a clamping action upon the teeth, so that the same will be able to resist considerable strain without becoming detached. It will of course be understood that this attachment can be used upon a single-shovel cultivator or upon a cultivator employing a plurality of shovels, one of the attachments being adapted to be substituted for each shovel. By substituting the attachment for the shovels of a two-row cultivator two rows can be worked simultaneously. The attachment is especially desirable in view of its simple and inexpensive construction and its durability. By having the inclined intermediate offset portion the harrow attachment can be fastened to the usual inclined stock and the teeth will be maintained at a proper angle to the ground.

What is claimed is—

1. A harrow attachment for cultivators comprising an elongated strip having integral longitudinally-extending straps struck therefrom, and teeth interposed between and held by the straps and the strip.

2. A harrow attachment for cultivators comprising an elongated strip having an offset intermediate portion, longitudinally-extending straps integral with and struck from the strip, and teeth interposed between and held in position by the straps and strip.

3. A harrow attachment for cultivators comprising an elongated strip having an inclined intermediate offset portion, longitudinally-extending straps integral with and struck from the strip, and teeth interposed between the strips and strap and held in position by frictional contact therewith.

4. A harrow attachment for cultivators comprising an elongated strip of resilient material having an inclined offset intermediate portion, and longitudinally-extending straps integral with and struck from the strip at opposite sides of the intermediate portion, and teeth disposed between and clamped in position by the strip and straps.

5. The combination with a cultivator-stock; of a harrow attachment comprising an elongated strip having an intermediate inclined offset portion, means for securing said portion to the stock, straps integral with and struck from the strip, and teeth interposed between and clamped in position by the strip and straps.

In testimony that I claim the foregoing as my own I have hereto affixed my signature in the presence of two witnesses.

WILLIAM E. WRIGHT.

Witnesses:
W. L. HOLLAND,
J. M. RED.